Oct. 9, 1962 R. COBURN 3,057,252
TIME COMPRESSION PROJECTOR FOR PHOTOGRAPHIC FILM
Filed Oct. 7, 1959

INVENTOR.
RICHARD (NMI) COBURN
BY
ATTORNEYS

United States Patent Office 3,057,252
Patented Oct. 9, 1962

3,057,252
TIME COMPRESSION PROJECTOR FOR PHOTOGRAPHIC FILM
Richard Coburn, San Diego, Calif., assignor to the United States of America as represented by the Secretary of the Navy
Filed Oct. 7, 1959, Ser. No. 845,041
6 Claims. (Cl. 88—16.8)
(Granted under Title 35, U.S. Code (1952), sec. 266)

The invention described herein may be manufactured and used by or for the Government of the United States of America for governmental purposes without the payment of any royalties thereon or therefor.

This invention relates to the projection of photographic images and more particularly to an improved system or projector by which a series of such images may be presented rapidly for visual inspection. Rapid viewing of a series of pictures is frequently desirable when a slower photographic process is being studied, such as in time-lapse photography. This enables the viewer to comprehend complex relationships he would not be aware of otherwise. The application of this principle with radar and sonar displays would increase their effectiveness for target detection, tracking and counter-measure work. For example in radar and sonar photography, it is an advantage to minimize this time interval as much as possible and thus bring out or emphasize a representative echo from a moving target. To accomplish this, a time compression projector has been developed as described in this application.

In the use of a conventional radar screen, a target is frequently masked by noise and random echoes. To pick out a moving target on a radar screen, especially one of slow motion, depends on the observer's experience and ability to detect the relative change in target position between sequential scans. However, if a series of frame negatives were projected in rapid sequence in a superimposed position, the moving target can easily be seen as a moving spot as distinguished from the masked return which may or may not be seen when viewing a single radar scan. This type of display is made possible by means of the time compression projector of this invention.

The general purpose of the invention is to provide a means for recording radar video, and playing back on a visual display a fixed length of it, repeatedly at an accelerated rate, in order to impart to targets an apparent motion. Radar video has ordinarily been displayed on a cathode ray tube without alteration of the time rate of presentation, except for storage by the CRT phosphor. With conventional radar displays, many targets remain undetected until at short range, tracking is difficult, and jamming, noise or interference may obliterate the target. With operational time compression, targets are often detected at much greater ranges, tracking is simplified because the operator can get a direct estimate of target course and speed, and it becomes possible to read through jamming, noise, or interference because the target has a coherent movement pattern whereas the background does not.

The primary object of this invention is to provide a time compression system for use with radar and sonar photographic records in order to take more advantage of the information available in those displays such as to distinguish moving objects or targets from stationary ones.

A further object of this invention is to provide a time compression projector incorporating moving optical means for rapidly scanning a stationary film strip.

These and other objects of the present invention will become apparent from the detailed description when read in conjunction with the accompanying drawings in which.

Figure 1:
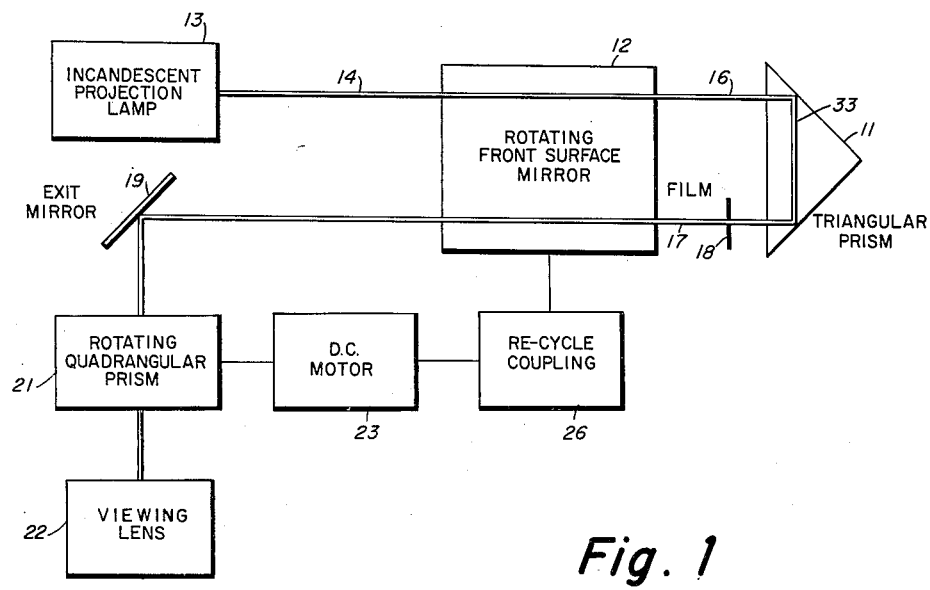
FIG. 1 is a simplified block diagram of the optical-scan projection system.

A plurality of triangular prisms 11, one for each frame of the sample films to be examined, are mounted in a cylindrical form. The film sample 18 is mounted adjacent the prisms on a plurality of nylon covered rollers 32, FIG. 2, one between each pair of prisms 11. The rollers 32 are radially adjustable for moving the film frames into register with the prism face. An alternate method for radially adjusting the position and length of the film sample is by interchangeable nylon covered rollers 32, of larger or smaller size as required.

A light source 13 directs a beam of light 14 toward the axis of a rotating front surface mirror 12 which deflects the beam 16 toward the triangular prisms 11 respectively, in the order of rotation. The deflected beam 16 is offset in the triangular prism 11 along the path 33, FIG. 1, and emerges as the offset beam 17 which is directed through the respective prisms and adjacent film frame, back to the rotating mirror 12 and thence to the exit mirror 19. The exit mirror 19 deflects the offset beam 17 at right angles to a point outside the cylindrical prism form into the lens assembly 22 for viewing the composite display. A rotating quadrangular prism 21 is located between the exit mirror 19 and the lens assembly 22 in the light beam path.

The rotating quadrangular prism 21 is driven by motor 23. The rotating mirror 12, mounted on shaft 31, is also driven by motor 23 through sprockets 27—28 and chain 29. More specifically, the quadrangular prism 21 is rotatively linked to the mirror 12 in a drive ratio of 15 to 1 so as to rotate a quarter-turn as the light beam sweeps through 12 degrees (produced by 6 degrees rotation of mirror 12). Rotation of the quadrangular prism 21 compensates for the smearing of the image which would otherwise occur due to mirror rotation.

Figure 2:
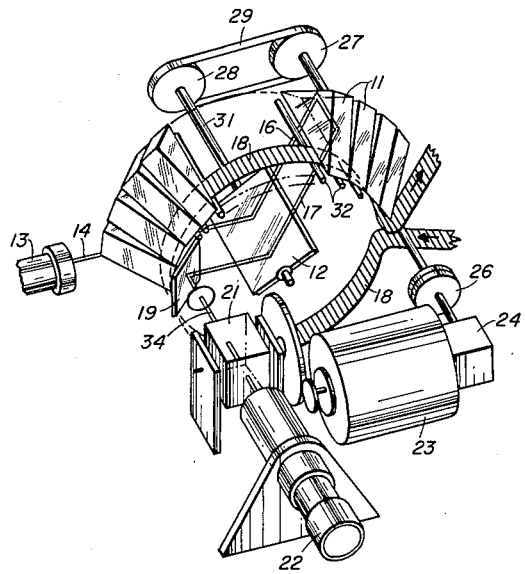
FIG. 2 is a cut-away isometric of the system.

The recycle coupling 26 located in the drive train for the mirror 12 is illustrated in FIG. 2. After the rotating mirror 12 sweeps through its scanning angle (150 degrees mirror rotation) it is released from the motor through a recycle coupling 26 and is rapidly returned to its starting position by spring action. Thus the "dark" cycle is very short with respect to the projection sequence.

The principles of operation of the optical-scan approach is illustrated in a simplified block diagram FIG. 1. Light from an incandescent projection lamp 13 is beamed 14 to strike the center of the scanning front-surface mirror 12. The mirror 12 bends the light beam 14 causing it to strike one of 24 triangular prisms 11 arranged along the arc of a circle. The prism 11 reverses and displaces the light beam 16, directing it through the film 18. From here the image is projected to the rotating mirror 12 along the off-set beam path 17, which in turn reflects it to a small exit mirror 19 mounted at 45 degrees with respect to the incident beam. The exit mirror 19 bends the beam so as to pass it through the rotating parallel faced prism 21 and into the lens assembly 22. The drawings illustrate the rotating quadrangular prism 21 which compensates for the smearing of the image introduced by the scanning mirror 12. The quadrangular prism 21 and scanning mirror 12 are driven from the same motor 23 at shaft speed ratios of 15 to 1. The prism 21 must rotate 90 degrees for each 6 degrees rotation of mirror 12. By varying the speed of motor 23, rapid viewing of a series of pictures may be adusted to produce the correct rate of time compression required to display a moving target in proper contrast to the background noises or fixed objects.

FIG. 2 illustrates a simplified isometric view of the projector portion of a time compressor incorporating the optical-scan principle. Prisms are spaced 12 degrees apart, except for a 60-degree sector opposite the projection lamp 13, and also for one space behind the exit mirror 19. Thus the ready-access storage bank occupies 25/30 of the circumference, although the one frame in the center of the sequence behind the exit mirror 19 is omitted. Since the beam sweeps through an angle of rotation twice that of the mirror 12, the projection sequence requires only 150 degrees of mirror 12 rotation. After the mirror 12 sweeps through this angle, it is released from the motor through a "recycle" coupling 26 and is rapidly returned to its starting position by spring action.

A strobe light may be used with this optical-scan projector in lieu of the combination incandescent lamp in conjuncton with the rotating quadrangular prism. The preferred way of firing the strobe is by means of a keying circuit which generates a firing pulse for the strobe each time a keying line on a film frame is scanned by the mirror.

The triangular prisms 11 are rigidly mounted in prism holders designed to keep them in precisely correct vertical orientation in circular form. The front edges of the prism 11 are exactly parallel with the axis of the mirror 12 shaft and means are provided for locking the prisms in place once they are correctly oriented. The plurality of triangular prisms are arranged in circular form. Each prism is shaped as a right angle isosceles triangle with the side of the triangle representing the hypotenuse being parallel with the axis of the circular form.

The rotating mirror 12 is large enough to accommodate both the upper or direct beam 14 and the lower or off-set beam 16 at all points in the projection sequence. It is front surfaced with the axis of rotation lying in the mirror surface. The exit mirror 19 is also front surfaced and no larger than necessary to accommodate the full image size.

The quadrangular parallel face prism is used with the thickness $$T = 1.490 \left( \frac{n}{n-1} \right)$$

where $n$ is the index of refraction. It is gear linked to the rotating mirror 12 in a ratio of 15 to 1 and compensates for the sweeping image.

Obviously many modifications and variations of the present invention are possible in the light of the above teachings. It is therefore to be understood that within the scope of the appended claims the invention may be practiced otherwise than as specifically described.

What is claimed is:

1. A time-compression projector device comprising a plurality of triangular prisms arranged in a circular path, a light beam source, a plane mirror rotatively supported along the axis of said circular path and having its reflective surface extending radially therefrom, a light beam directed at said mirror and deflected therefrom along a path entering said prisms respectively as the mirror rotates, said prisms being mounted for reflecting the light beam along a parallel path offset from the entering path, an exit mirror positioned for intercepting the light beam along said offset path and reflectiong said beam along on exit path toward a viewing device, a rotating quadrangular prism positioned in said exit path, a sample film containing a plurality of frames positioned adjacent the circular path of the triangular prisms one frame for each triangular prism, means for rapid recycling said rotating mirror at the end of its sweep, and means for driving the rotating mirror and quadrangular prism in synchronism whereby the beam of light deflected from said rotating mirror will progressively enter a triangular prism and its respective film frame at each quarter revolution of said quadrangular prism.

2. A time compression device comprising a projector having a film sample bearing a plurality of frames quiescently mounted in said projector, a light beam source, operational optical means for rapidly scanning said plurality of film frames with the light beam from said light beam source at a predetermined rate, optical means for viewing the plurality of film frame images in superimposed relationship said operational optical means includes a plurality of triangular prisms arranged in a circular path, the cross section of each triangular prism being a right angle isosceles triangle having its plane perpendicular to and its hypotenuse or inner surface parallel with the axis of the circular path, and a front surfaced mirror rotatively supported along the axis of said circular path for deflecting the light beam sequentially through the inner surface of said prisms.

3. A time compression device as set forth in claim 2 wherein said film sample is mounted on a plurality of rollers arranged in a circular path adjacent the inner surface of said triangular prisms, one roller interjacent each pair of prisms, and means for radially adjusting the position of the film frames into register with the respective prisms.

4. A time compression device as set forth in claim 2 wherein said optical means for projecting the plurality of film flame images in superimposed relationship includes a quadrangular prism rotatively coupled to the scanning device in the driving ratio of one frame scanned to each quarter revolution of the quadrangular prism whereby the true image is projected through said prism and received by the viewer only when the beam is incident to one of the four surfaces of said prism.

5. A time compression device comprising a projector having a film sample bearing a plurality of frames quiescently mounted in said projector, a light beam source, operational optical means for projecting a light beam from said light beam source through said film frames respectively at a predetermined scanning rate, said optical means includes a plurality of triangular prisms arranged in a cylindrical path with their internal surfaces parallel with the axis of said path and circumferentially spaced to coincide with the film frame spacing, a rotating mirror for deflecting said light beam successively toward each prism whereby the light beam is reversed, displaced, and returned through said film frames back to the rotating mirror, an exit mirror for directing the return beam along an exit path toward a viewing device, a rotating quadrangular prism in the exit beam path to compensate for the smearing of the image due to mirror rotation, means for driving the rotating mirror and quadrangular prism in synchronism whereby the mirror is rotated progressively through an angle equal to half the sweep of the light beam between adjacent triangular prisms and film frames while the quadrangular prism is rotated through an angle of ninety degrees about an axis perpendicular to the exit beam and means for viewing the images therefrom in superimposed relation.

6. A time compression device as described in claim 5 wherein said rotating mirror and quadrangular prism are synchronously driven at the rate of six degrees mirror rotation to ninety degrees prism rotation, and a rapid recycling coupling is provided in said drive for returning said mirror to its starting position after each scanning cycle.

References Cited in the file of this patent

UNITED STATES PATENTS

| | | |
|---|---|---|
| 2,494,082 | Baird | Jan. 10, 1950 |
| 2,668,473 | Brixner | Feb. 9, 1954 |
| 2,718,549 | Mattke | Sept. 20, 1955 |